United States Patent
Smith

(10) Patent No.: US 9,860,221 B2
(45) Date of Patent: Jan. 2, 2018

(54) INTERNET OF THINGS GROUP FORMATION USING A KEY-BASED JOIN PROTOCOL

(71) Applicant: Intel Corporation, Santa Clara, CA (US)

(72) Inventor: Ned M. Smith, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/643,964

(22) Filed: Mar. 10, 2015

(65) Prior Publication Data

US 2016/0269374 A1    Sep. 15, 2016

(51) Int. Cl.
*H04L 29/06* (2006.01)

(52) U.S. Cl.
CPC ........ *H04L 63/065* (2013.01); *H04L 63/0435* (2013.01); *H04L 63/061* (2013.01); *H04L 63/0823* (2013.01); *H04L 63/20* (2013.01)

(58) Field of Classification Search
CPC ... H04L 63/065; H04L 63/04; H04L 63/0428; H04L 63/0435
See application file for complete search history.

(56) References Cited

U.S. PATENT DOCUMENTS

| 4,200,770 | A | 4/1980 | Hellman et al. |
| 8,850,543 | B2 | 9/2014 | Von Bokern et al. |
| 2004/0044891 | A1* | 3/2004 | Hanzlik ............... H04L 63/0272 713/150 |
| 2007/0165860 | A1* | 7/2007 | Handa et al. ................. 380/259 |
| 2007/0204149 | A1* | 8/2007 | Balfanz ................ G06Q 20/382 713/156 |
| 2011/0307694 | A1* | 12/2011 | Broustis ................ H04L 63/065 713/163 |
| 2013/0046983 | A1 | 2/2013 | Zhu et al. |

(Continued)

FOREIGN PATENT DOCUMENTS

| KR | 100789377 B1 | 12/2007 |
| KR | 20100022927 A | 3/2010 |
| KR | 20140077127 A | 6/2014 |

OTHER PUBLICATIONS

Li, "Enhanced Privacy ID: A Remote Anonymous Attestation Scheme for Hardware Devices" published in Intel Technology Journal, vol. 13, Issue 2, 2009.*

(Continued)

*Primary Examiner* — Khang Do
(74) *Attorney, Agent, or Firm* — Jordan IP Law, LLC

(57) ABSTRACT

Systems and methods may provide for determining a first key associated with a first group and determining a first resource exposure policy for the device with respect to the first group. Additionally, the first key may be used to send first operational and security context data to a first dynamic group verifier in accordance with the first resource exposure policy. In one example, a second key associated with a second group is determined, a second resource exposure policy is determined for the device with respect to the second group, a local context change is detected, and the second key is used to send, in response to the local context change, second operational data to a second dynamic group verifier in accordance with the second resource exposure policy.

23 Claims, 6 Drawing Sheets

(56) References Cited

U.S. PATENT DOCUMENTS

| | | | |
|---|---|---|---|
| 2013/0151854 A1* | 6/2013 | Meister | H04L 9/0844 |
| | | | 713/171 |
| 2014/0181513 A1* | 6/2014 | Marek | H04L 63/062 |
| | | | 713/168 |
| 2014/0241354 A1* | 8/2014 | Shuman et al. | 370/390 |
| 2015/0019710 A1 | 1/2015 | Shaashua et al. | |
| 2015/0067118 A1* | 3/2015 | Gatto | G06Q 30/0241 |
| | | | 709/223 |
| 2015/0229654 A1* | 8/2015 | Perier | |
| 2015/0350906 A1* | 12/2015 | Patil et al. | |
| 2016/0013948 A1* | 1/2016 | Moses | |

OTHER PUBLICATIONS

Wikipedia, "Internet of Things," Wikipedia.org, retrieved Feb. 10, 2015, 22 pages.
Wikipedia, "Zero-Knowledge Proof," Wikipedia.org, retrieved Feb. 3, 2015, 10 pages.
Wind River Systems, "Wind River Open Virtualization," www.windriver.com, Jan. 2015, 4 pages.
International Search Report & Written Opinion for International Patent Application No. PCT/US2016/013852, dated May 2, 2016, 10 pages.
International Preliminary Report on Patentability for International Patent Application No. PCT/US2016/013852, dated Sep. 21, 2017, 7 pages.

* cited by examiner

US 9,860,221 B2

INTERNET OF THINGS GROUP FORMATION USING A KEY-BASED JOIN PROTOCOL

TECHNICAL FIELD

Embodiments generally relate to the formation of device groups. More particularly, embodiments relate to Internet of Things (IoT) device group formations using a key-based join protocol.

BACKGROUND

The Internet of Things (IoT) may involve household devices such as thermostats, washers/dryers, and so forth, interactively reporting operational data to homeowners, utility companies, and other analytical services. Conventional IoT approaches, however, may lead to privacy, safety and security concerns. For example, from a privacy standpoint, open sharing of operational data may enable others to know precisely when events are taking place within the household. Additionally, safety may be negatively impacted when unintended device interactions lead to malfunctions and/or unexpected operation. Moreover, security may be lessened when a compromised IoT device is used to arrest control of other IoT devices in the household.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
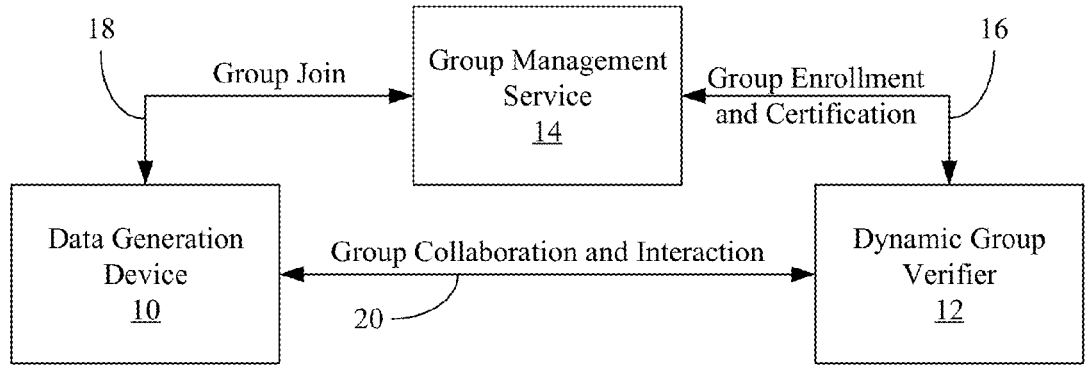
FIG. 1 is a block diagram of an example of a group formation, collaboration and interaction architecture according to an embodiment.

Turning now to FIG. 1, a group formation, collaboration and interaction architecture is shown in which a data generation device 10 such as, for example, a thermostat, washer/dryer, air conditioner, smoke alarm, intelligent light switch, window shade controller, camera, etc., dynamically joins groups of devices in order to exchange data with one or more dynamic group verifiers (DGVs) 12 such as, for example, a utility company, cloud analytics service, another data generation device or other data processing entity. In the illustrated example, a group management service (GMS) 14 facilitates the creation of device groups by engaging in a group enrollment and certification communication 16 with the dynamic group verifier 12 and engaging in a group join communication 18 with the device 10. The group management service 14 might run in the local domain of an Internet of Things (IoT) on a user device such as, for example, a desktop computer, notebook computer, tablet computer, convertible tablet, smart phone, personal digital assistant (PDA), mobile Internet device (MID), wearable computer, and so forth.

More particularly, the operational context of the group management service 14 may be tied to an "owner" entity that is interested in preserving privacy given an owner network of IoT devices. That is to say, there may be no need for a trusted third party that functions as the group management service 14. Rather, the owner may negotiate with the dynamic group verifier 12 to set the terms of privacy, determine group operation and instantiate the group according to these requirements.

The group enrollment and certification communication 16 may therefore involve receiving a group formation request from the dynamic group verifier 12, wherein the group join communication 18 may involve provisioning the device 10 with a key (e.g., private/secret key in an asymmetric cryptography system) in response to the group formation request. Additionally, the device 10 may use the provisioned key to conduct a group collaboration and interaction communication 20 with the dynamic group verifier 12 in order to report operational and security context data such as, for example, temperature measurements and/or settings, activation state information, images, historical usage information, and so forth. The device 10 may join and share operational and security context data with several different groups in this fashion. As will be discussed in greater detail, the use of a key-based join protocol may obviate a number of concerns with regard to privacy, safety and/or security.

In the illustrated example, any group member may function in the capacity of the dynamic group verifier 12 and as the data generation device 10. These roles are not limited according to the number of instances in a group. Indeed, the group membership may change/fluctuate so that it grows and shrinks over time. The join protocol may define how membership increases. A revocation method as defined by a cryptosystem may define how membership decreases, wherein the revocation method may use a previous signature of the once joined member to be "shunned" by the group by placing that member's signature on a signature revocation list (SigRL). All group members may perform the role of the dynamic group verifier 12 and may also deny interactions with "shunned" or revoked devices.

Figures 2A, 2B:
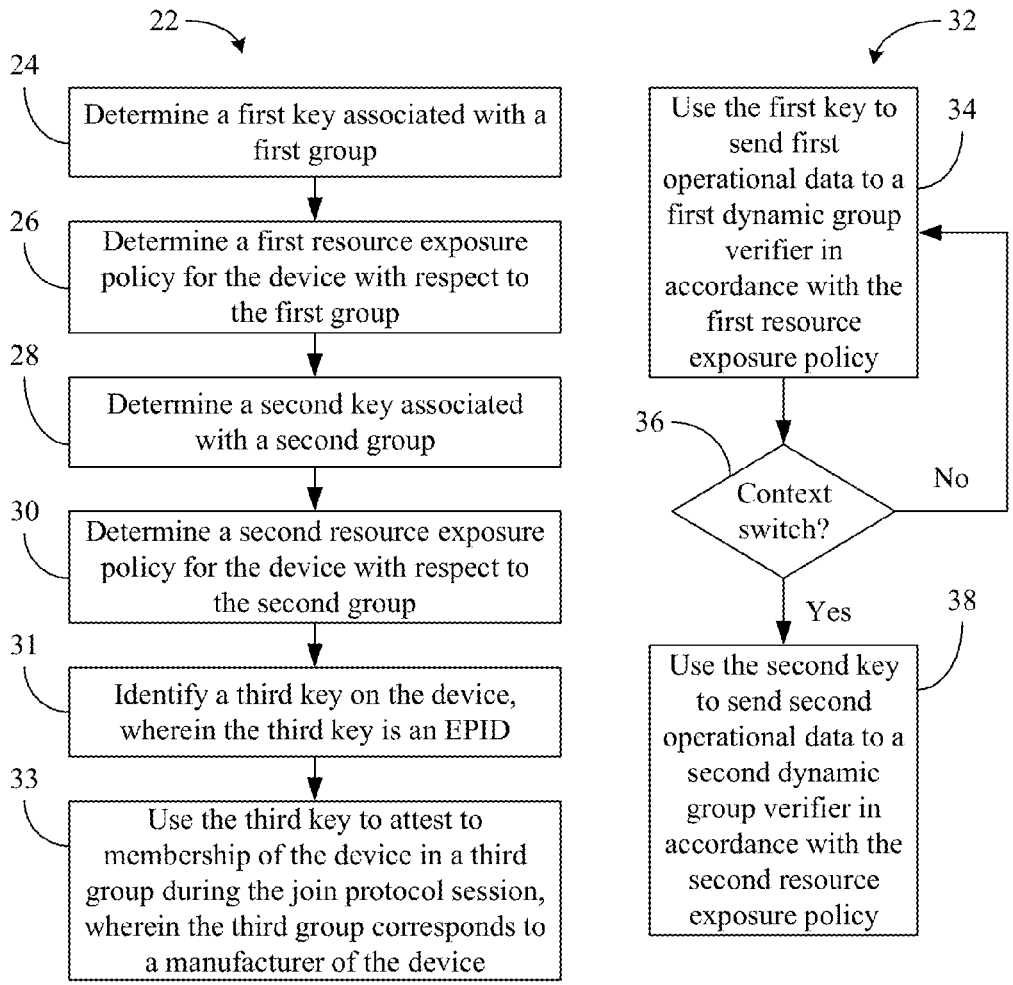
FIG. 2A is a flowchart of an example of a method of forming device groups according to an embodiment.
FIG. 2B is a flowchart of an example of a method of sharing operational data according to an embodiment.

FIG. 2A shows a method 22 of operating a device such as, for example, the device 10 (FIG. 1). The method 22 may be implemented as a module or related component in a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof. For example, computer program code to carry out operations shown in method 22 may be written in any combination of one or more programming languages, including an object oriented programming language such as JAVA, SMALLTALK, C++ or the like and conventional procedural programming languages, such as the "C" programming language or similar programming languages.

Illustrated processing block 24 provides for determining a first key associated with a first group, wherein a first resource exposure policy may be determined for the device at block 26 with respect to the first group. The resource exposure policy may identify, for example, which resources of the device are visible to other members of the group. Thus, if the device is a thermostat, the resource exposure policy may indicate to what extent thermostat settings, temperature measurements and/or corresponding time-of-day information are accessible by a particular dynamic group verifier or other device associated with the first group. If, on the other hand, the device is a smoke alarm the resource exposure policy might indicate to what extent battery life information, historical activation information, chemical measurements and/or corresponding time-of-day information are accessible by the associated dynamic group verifier and/or other devices. Block 28 may determine a second key associated with a second group, wherein a second resource exposure policy may be determined for the device at block 30 with respect to the second group. The key and exposure policy determinations may be repeated for any number of groups, depending on the circumstances.

In one example, the method 22 also provides for identifying a third key on the device at block 31, wherein the third key is an enhanced privacy identifier (EPID). In general, the manufacturer of at least a portion of the device may store (e.g., in field programmable fuses or other write-once memory) the EPID to a trusted execution environment (TEE) on the device during fabrication of the device or its components (e.g., processor, controller, chipset). Indeed, the manufacturer may generate many such keys for a product line corresponding to a single public key, wherein each EPID is essentially an instance of an EPID cryptography system in which the manufacturer is the group name. Illustrated block 33 uses the third key to attest to membership of the device in a third group during the join protocol session, wherein the third group corresponds to the manufacturer.

Thus, with continuing reference to FIGS. 1 and 2A, dynamic group verifiers such as the dynamic group verifier 12 (e.g., DGV-1, DGV-2, etc.) may use the manufacturer EPID (e.g., EPID-i) as an attestation of the TEE environment in which the device 10 is protected. The EPID-i attestation may assert that the TEE is a legitimately constructed endpoint and that the dynamic EPID (e.g., EPID-1, EPID-2, etc.) is protected using the legitimate manufacturer TEE. The group enrollment and certification communication 16 may therefore include the EPID-i signature of the TEE in the device 10 (if requested) to prove to the dynamic group verifier 12 that the EPID is indeed protected by a legitimate manufacturer TEE. Conducting the group join communication 18 and the group enrollment and certification communication 16 within the context of an EPID-i authenticated session may enable the semantics of the manufacturer EPID context to be inherited by the dynamic EPID group contexts. In other words, Group-1 EPIDs may assert membership in Group-1 AND protection of Group-1 by a legitimate manufacturer TEE.

Turning now to FIG. 2B, a method 32 of sharing operational data is shown. The method 32 may generally be implemented in a data generation device such as, for example, the device 10 (FIG. 1), already discussed. More particularly, the method 32 may be implemented as a module or related component in a set of logic instructions stored in a machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof In the illustrated example, processing block 34 provides for using the first key to send first operational and security context data to a first dynamic group verifier in accordance with the first resource exposure policy. For example, if the device is a thermostat, block 34 might involve reporting all data including thermostat settings, temperature measurements and corresponding time-of-day information to the homeowner. A determination may be made at block 36 as to whether a local context change has been detected. The local context change may include, for example, receipt of a data request from a different dynamic group verifier, expiration of a timer (e.g., associated with a periodic reporting requirement), and so forth.

If the local context change has been detected, illustrated block 38 uses the second key to send second operational and security context data to a second dynamic group verifier in accordance with the second resource exposure policy. Thus, in the thermostat example, block 38 might involve reporting average temperature measurements (e.g., daily average, weekly average) but withholding thermostat settings and corresponding time-of-day information. If no local context change is detected, the device may continue to report operational data in accordance with the first resource exposure policy. Simply put, the first and second keys may enable the device to establish a context in multiple groups simultaneously. As a result, whenever a message associated with a member of the first group is received and the device is currently servicing a message from a member of the second group, the device may execute a context switch while ensuring that the resources associated with the first group are not shared with the context of the second group. Accordingly, the illustrated method 32 enables IoT and other data generation devices to exhibit different behavior in order to satisfy privacy, safety and security constraints established by the user/homeowner. As will be discussed in greater detail, the data transmission blocks 34 and 38 may involve conducting sigma protocol sessions between the device and the dynamic group verifier.

Figure 3:
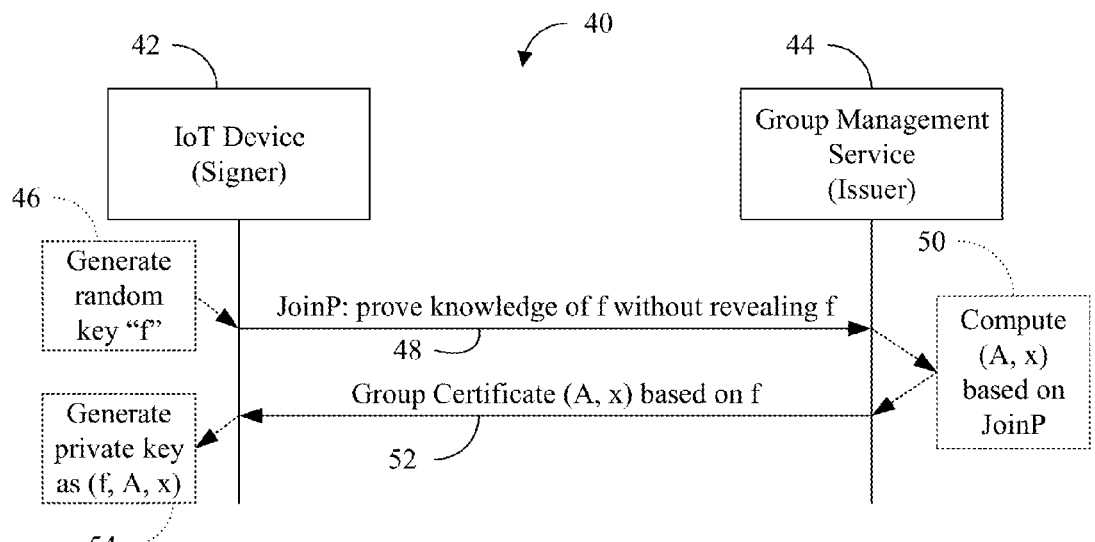
FIG. 3 is a signaling diagram of an example of a join protocol session according to an embodiment.

FIG. 3 shows a signaling diagram of a join protocol session 40 between an IoT device 42 and a group management service 44, wherein the join protocol session 40 may be part of a group join communication such as the group join communication 18 (FIG. 1), the IoT device 42 may be similar to the data generation device 10 (FIG. 1) and the group management service 44 may be similar to the group management service 14 (FIG. 1), already discussed. Thus, the join protocol session 40 may be used by the IoT device 42 to conduct the key determination blocks 24 and 28 (FIG. 2A), already discussed. In the illustrated example, the device 42 generally functions as a "Signer" and the group management service 44 generally functions as an "Issuer" with regard to a private key that is provisioned on the device 42.

More particularly, the device 42 may generate a random key "f" (e.g., a local secret) at block 46 and send a first message 48 (e.g., "JoinP") to the group management service 44, wherein the first message 48 is structured in accordance with a zero knowledge proof of knowledge protocol. More particularly, the first message 48 may prove knowledge of f without actually revealing f to the group management service 44. Upon receiving the first message 48, the illustrated group management service 44 determines and/or computes a group credential including a public key containing, for example, a group identifier "A" and proof response values "x" at block 50 based on the first message 48 and sends the group credential to the device 42 in a second message 52. Thus, the group credential may be a certificate or other credential that establishes a disambiguated name of a group. The device 42 may use the group credential and the local secret to construct/generate a private key (e.g., "f, A, x") at block 54, wherein the private key is associated with the particular group being joined by the IoT device 42. The private key resulting from block 54 may be an enhanced privacy identifier (EPID) key maintained in a trusted execution environment (TEE) of the device 42.

Figure 4:
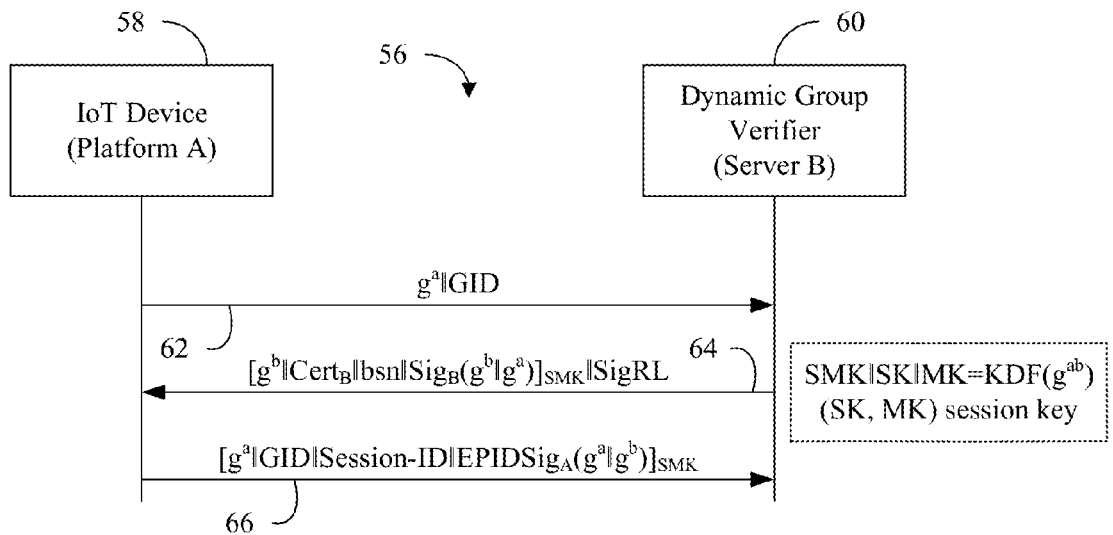
FIG. 4 is a signaling diagram of an example of a sigma protocol session according to an embodiment.

FIG. 4 shows a signaling diagram of a sigma protocol session 56 between an IoT device 58 and a dynamic group verifier 60, wherein the sigma protocol session 56 may be part of a communication such as the group collaboration and interaction communication 20 (FIG. 1), the IoT device 58 may be similar to the device 10 (FIG. 1) and the dynamic group verifier 60 may be similar to the dynamic group verifier 12 (FIG. 1), already discussed. Thus, the sigma protocol session 56, which is named for its similarity to the Z shape, may be used by the device 58 to conduct the data transmission blocks 34 and 38 (FIG. 2B), already discussed. In general, the device 58 may establish a set of symmetric session keys including pairwise symmetric session keys and one or more symmetric group keys in context of the sigma protocol session 56 with each group member by the dynamic group verifier 60. In the illustrated example, the device 58 generally functions as a "Platform A" and the dynamic group verifier 60 generally functions as a "Server B". In one example, the device 58 and the dynamic group verifier 60 use a Diffie-Hellman exchange to establish a set of symmetric session keys during the sigma protocol session 60.

More particularly, the device 58 may send a first message 62 including a device parameter (e.g., "$g^a$") concatenated with a group identifier (e.g., "GID") to obtain the expression:

$$g^a \| GID. \tag{1}$$

The dynamic group verifier 60 may concatenate a server parameter (e.g., "$g^b$"), a server certificate (e.g., "$Cert_B$"), a base name (e.g., "bsn"), and a signed concatenation of the device parameter and the server parameter (e.g., "$Sig_B$ ($g^b \| g^a$)") together, sign the result with a session key (e.g., "SMK") and concatenate the signed information with a signature revocation list (e.g., "SigRL") to obtain the expression:

$$[g^b \| Cert_B \| bsn \| Sig_B(g^b \| g^a)]_{SMK} \| SigRL. \tag{2}$$

Where a key derivation function (KDF) may define the set of session keys SK, MK (e.g., secrecy key, media access control/MAC key). The dynamic group verifier 60 may therefore send the result to the device 58 as a second message 64. The device 58 may in turn concatenate the device parameter, the group identifier, a session identifier (e.g., "Session-ID", representing a hash of the trusted execution environment), and a signed concatenation of the device parameter and the server parameter (e.g., "$EPIDSig_A$ ($g^b \| g^a$)") together, and sign the result with the session key to obtain the expression:

$$[g^a \| GID \| Session\text{-}ID \| EPIDSig_A(g^a \| g^b)]_{SMK}. \tag{3}$$

The device 58 may send the result to the dynamic group verifier as a third message 66. Thus, the resulting session keys may be specific to the device 58, while the private key only asserts membership in the group. Accordingly, the device 58 may remain relatively anonymous during the sigma protocol session 56. If the session keys are deleted and a new session key is created, the dynamic group verifier 60 would not be able to correlate a previous session to a subsequent session. Thus, the dynamic group verifier 60 may be somewhat limited in its ability to create a comprehensive database of correlated transactions. Additionally, the session keys may be used to negotiate a temporal identifier of the device 58 and track the device 58 for a lifespan that is shorter than the lifespan of the device group identifier. In other words, the temporal identifier facilitated by the session keys may be meaningful in the context of the group and may have a lifespan that expires when the device group identifier credential expires.

More particularly, the temporal identifier (e.g., D1, D2, . . . Dn—see below) may be associated with pairwise symmetric keys that are generated in the context of the Sigma protocol session 56 so that the security, attestation and privacy context (e.g., established by the group etc. . . . ) is intrinsic to the symmetric keys. Subsequent use of the symmetric keys may carry with it the security attestation and privacy context established with the sigma protocol session 56 but does not have the performance overhead of the sigma protocol session 56.

Additionally, there may be a second (or third) symmetric session key negotiated that is shared amongst the group members that supports secure multi-cast messaging. For example, IP (Internet Protocol) multi-cast, broadcast and chat messaging such as XMPP (Extensible Messaging and Presence Protocol, Internet Engineering Task Force) and MQTT (formerly Message Queue Telemetry Transport). In this context, a shared symmetric session key does not possess Diffie-Hellman values that are pairwise secrets. Rather, the shared symmetric session key may use a key derivation function (KDF) that includes attributes that are known by all members such as the group name. The random number may be chosen by the group management service or a more sophisticated group symmetric key generation algorithm may be used that accepts random values from each group member and requires re-keying when new members are added to the group.

The symmetric group key negotiation protocol (SGKNP) may be of the following form:
1. D1, D2, . . . , Dn each generate a random number (R1, R2, . . . Rn)
2. The GMS generates n nonce values N1, N2, . . . , Nn for each participating group member (D1, D2, . . . Dn). And sends nonce Nx to each member over an established pairwise symmetric key protected session.
3. Each device D1 signs its (Rx, Nx) tuple with EPID group key G1 and sends it to the GMS.
4. The GMS verifies each Nx while detecting replays and duplicates (having different R values).
5. GMS then produces a RandG=KDF(R1, R2, . . . , Rn)
6. Symmetric Group Key SGK=KDF(RandG, "Group-Name", "Multi-cast-group-name")
7. GMS then distributes SGK to each group member.
8. Subsequent m-cast and pub/sub interactions are performed using SGK.

Figure 5:
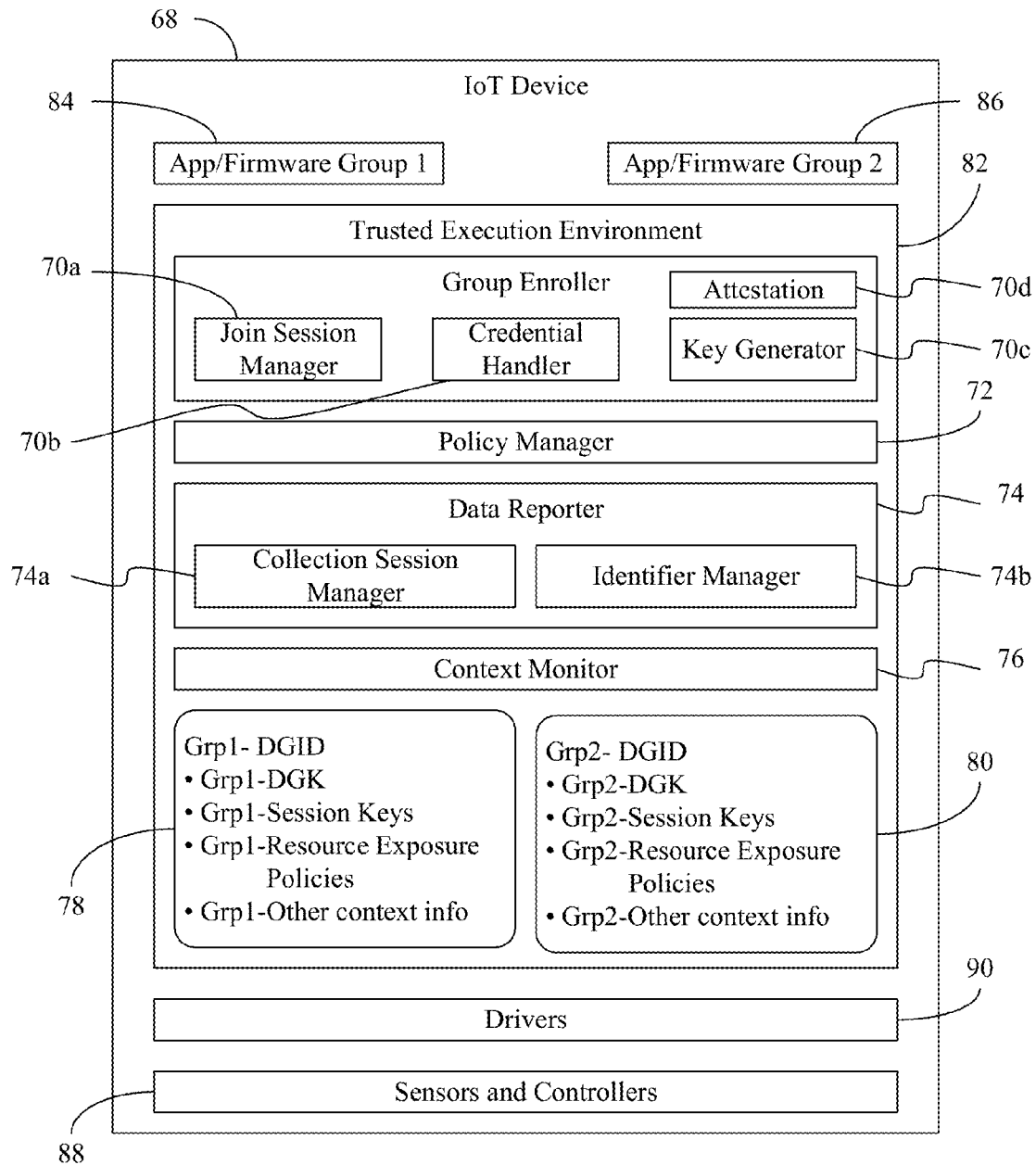
FIG. 5 is a block diagram of an example of a device according to an embodiment.

FIG. 5 shows a device 68 such as, for example, a thermostat, washer/dryer, air conditioner, smoke alarm, intelligent light switch, window shade controller, camera or other data generation device capable of being deployed as an IoT device. The device 68 may therefore readily be substituted for the device 10 (FIG. 1), the device 42 (FIG. 3) and/or the device 58 (FIG. 4), already discussed. In the illustrated example, a group enroller 70 (70a-70d) determines a first key associated with a first group, a second key associated with a second group, and so forth. Similarly, a policy manager 72 may determine a first resource exposure policy for the device with respect to the first group, a second resource exposure policy for the device with respect to the second group, and so forth.

The device 68 may also include a data reporter 74 (74a, 74b) that uses the first key to send first operational data to a first dynamic group verifier in accordance with the first resource exposure policy. Additionally, a context monitor 76 may detect a local context change (e.g., receipt of a data request from a different dynamic group verifier, expiration of a timer), wherein the data reporter 74 may use the second key to send, in response to the local context change, second operational data to a second dynamic group verifier in accordance with the second resource exposure policy. The number of groups and corresponding keys may vary depending on the circumstances.

In one example, the group enroller 70 includes a join session manager 70a to conduct a join protocol session with a group management service and a credential handler 70b to receive a group credential (e.g., establishing a disambiguated name of a group) from the group management service during the join protocol session. A key generator 70c may generate the first key based on the group credential and a local secret associated with the join protocol. As already discussed, the join protocol session may be conducted with a zero knowledge proof of knowledge protocol and the group credential may include a group public key and a group identifier. The group enroller 70 may also include an attestation component 70d to identify a third key on the device, wherein the third key is an EPID, and use the third key to attest to membership of the device in a third group during the join protocol session. The third group may correspond to a manufacturer of at least a portion of the device 68. Additionally, the illustrated data reporter 74 includes a collection session manager 74a that establishes a set of symmetric session keys during a sigma protocol session with the dynamic group verifier and an identifier manager 74b to optionally use the set of symmetric session keys to negotiate a temporal identifier of the device 68.

Moreover, first group information 78 (e.g., the first set of symmetric session keys, first key, first resource exposure policy, etc.) and second group information 80 (e.g., the second set of symmetric session keys, second key, second resource exposure policy, etc.) may be maintained in a trusted execution environment 82 on the device 68. The illustrated device 68 also include first group software 84 (e.g., application, firmware) to define an interface and behavior that is specific to the first group and second group software 86 (e.g., application, firmware) to define an interface and behavior that is specific to the second group. The interface definitions may be embedded or dynamically provisioned as part of the group formation using procedure calls in an interface definition language such as, for example, RSDL (RESTful Service Description Language), AIDL (ANDROID Interface Definition Language), etc. The device 68 may also include one or more sensors and controllers 88 to generate the data being shared (e.g., measurements, settings) and one or more drivers 90 to interface with the sensors and controllers 88.

Figure 6:
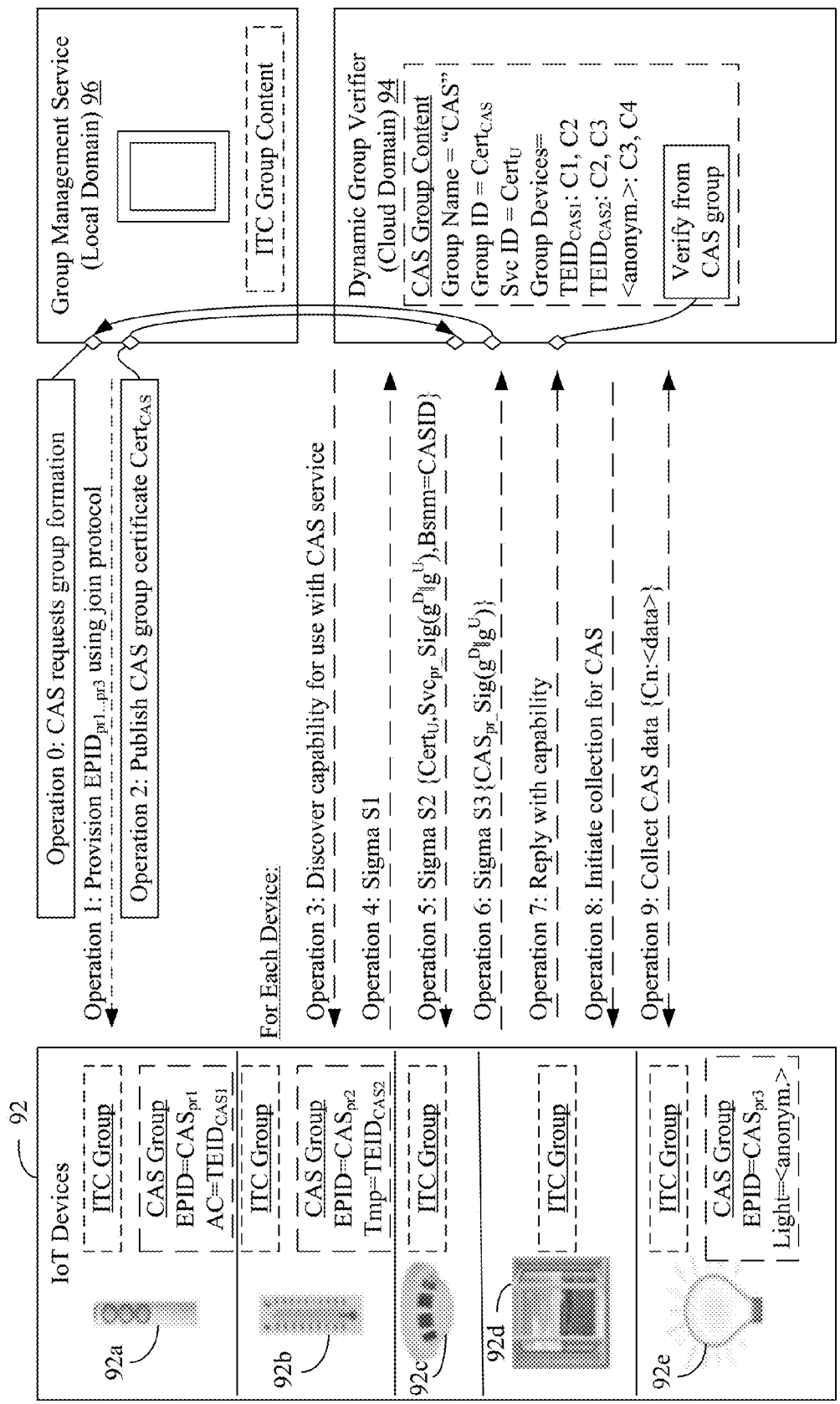
FIG. 6 is an illustration of an example of group formation, collaboration and interaction approach in a household setting according to an embodiment.

Turning now to FIG. 6, an illustration of an example of group formation, collaboration and interaction approach in a household setting is shown. In the illustrated example, a set of IoT devices 92 (92a-92e) includes a thermostat 92a, a temperature sensor 92b, a smoke alarm 92c, a window shade controller 92d and a light switch 92e. The IoT devices 92 may be formed into multiple different groups such as, for example, an "ITC" group, a "CAS" group, and so forth, wherein the groups have different resource exposure policies. In the illustrated example, a dynamic group verifier 94 (e.g., operating in the cloud domain) issues (e.g., "Operation 0") a request to form the CAS group to a group management service 96 (e.g., operating in the local domain). The group management service 96 may then provision (e.g., "Operation 1", using a discovery service, multicast discovery protocol, etc.) a key (e.g., $EPID_{pr1 \ldots pr3}$) to each of the devices 92a, 92b, 92e as members of the CAS group. The group management service 96 may also publish (e.g., "Operation 2") the group certificate (e.g., CertcAs) for the CAS group. Thus, Operation 0 and Operation 2 may be part of a group enrollment and certification communication such as the group enrollment and certification communication 16 (FIG. 1) and Operation 1 may be part of a group join communication such as the group join communication 18 (FIG. 1), already discussed.

For each device in the CAS group, the dynamic group verifier 94 may generally conduct illustrated Operations 3-9. More particularly, the dynamic group verifier 94 may initiate (e.g., "Operation 3") a discovery of the capability of the device for the CAS group. The device may then send (e.g., "Operation 4") the first message (e.g., "S1") of a sigma protocol session to the dynamic group verifier 94, wherein the dynamic group verifier 94 may respond (e.g., "Operation 5") with the second message (e.g., "S2") of the sigma protocol session, followed by the device sending (e.g., "Operation 6") the third message ("S3") of the sigma protocol session to the dynamic group verifier 94. Upon successful completion of the sigma protocol session, the device may send (e.g., "Operation 7") its capability (e.g., TEIDcAs: C1 . . . Cn) to the dynamic group verifier 94. Additionally, the dynamic group verifier 94 may initiate (e.g., "Operation 8") collection of data for the CAS group, along with an optional provisioning of a group policy, group key, etc. The illustrated approach concludes with the collection (e.g., "Operation 9") of operational data in accordance with the appropriate resource exposure policy.

Of particular note is that in the illustrated example, the thermostat 92a and the temperature sensor 92b negotiate temporary device identifiers (e.g., TEIDs) that permit specific temperature readings to be tracked over time. The illustrated light switch 92e, however, remains anonymous within the group and might only report total on/off monthly data rather than exposing a detailed log of when the light was in an on or off position. Meanwhile, the group management service 96 in the local domain may monitor and control all devices (e.g., in the ITC group) with full tracking detail and access to all device interfaces. The types of devices 92 and group policies described herein are to facilitate discussion only and may vary depending on the circumstances.

Figure 7:
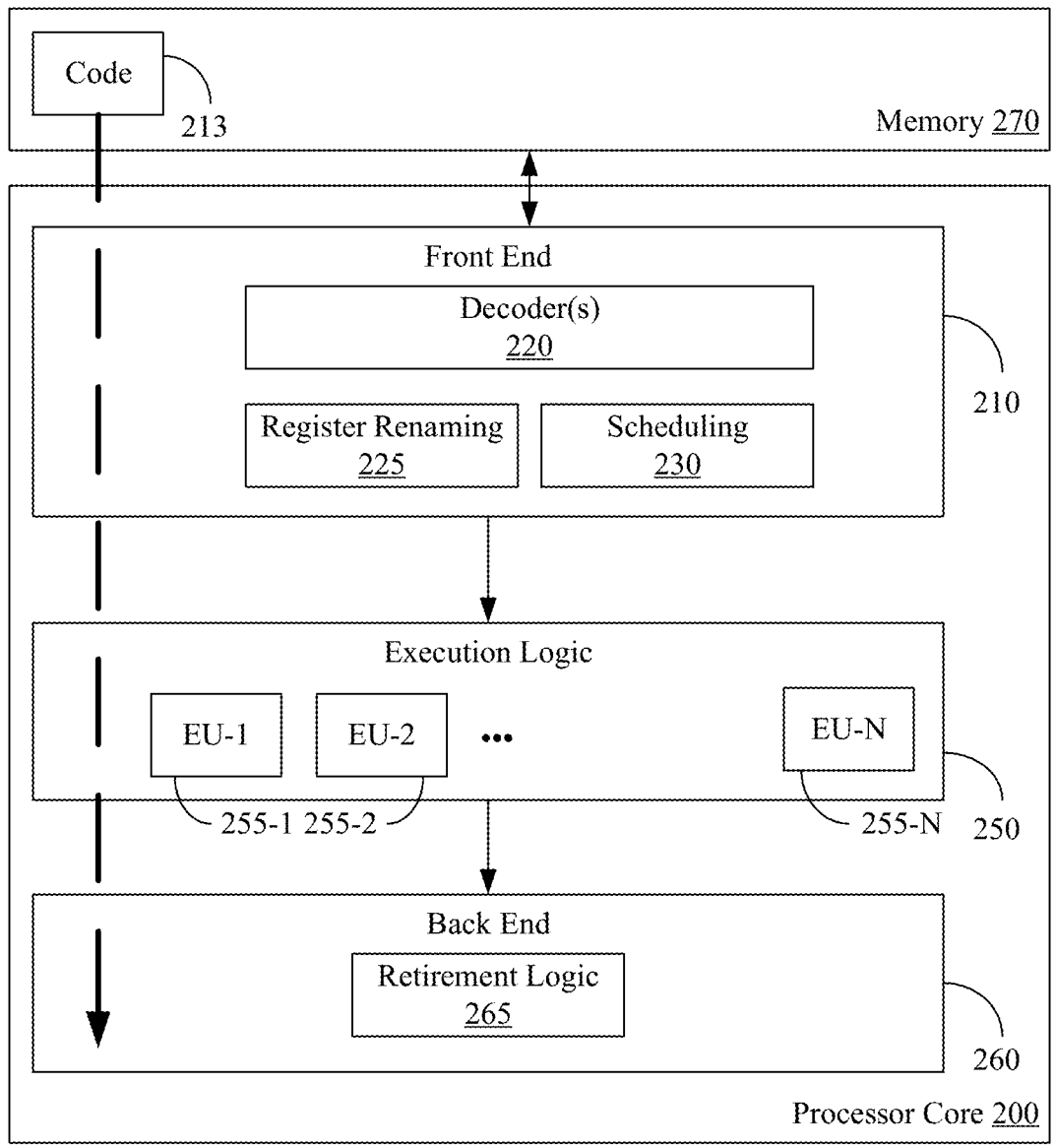
FIG. 7 is a block diagram of an example of a processor according to an embodiment.

FIG. 7 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 7, a processing element may alternatively include more than one of the processor core 200 illustrated in FIG. 7. The processor core 200 may be a single-threaded core or, for at least one embodiment, the processor core 200 may be multithreaded in that it may include more than one hardware thread context (or "logical processor") per core.

FIG. 7 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement the method 22 (FIG. 2A) and/or the method 32 (FIG. 2B), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 7, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 8:
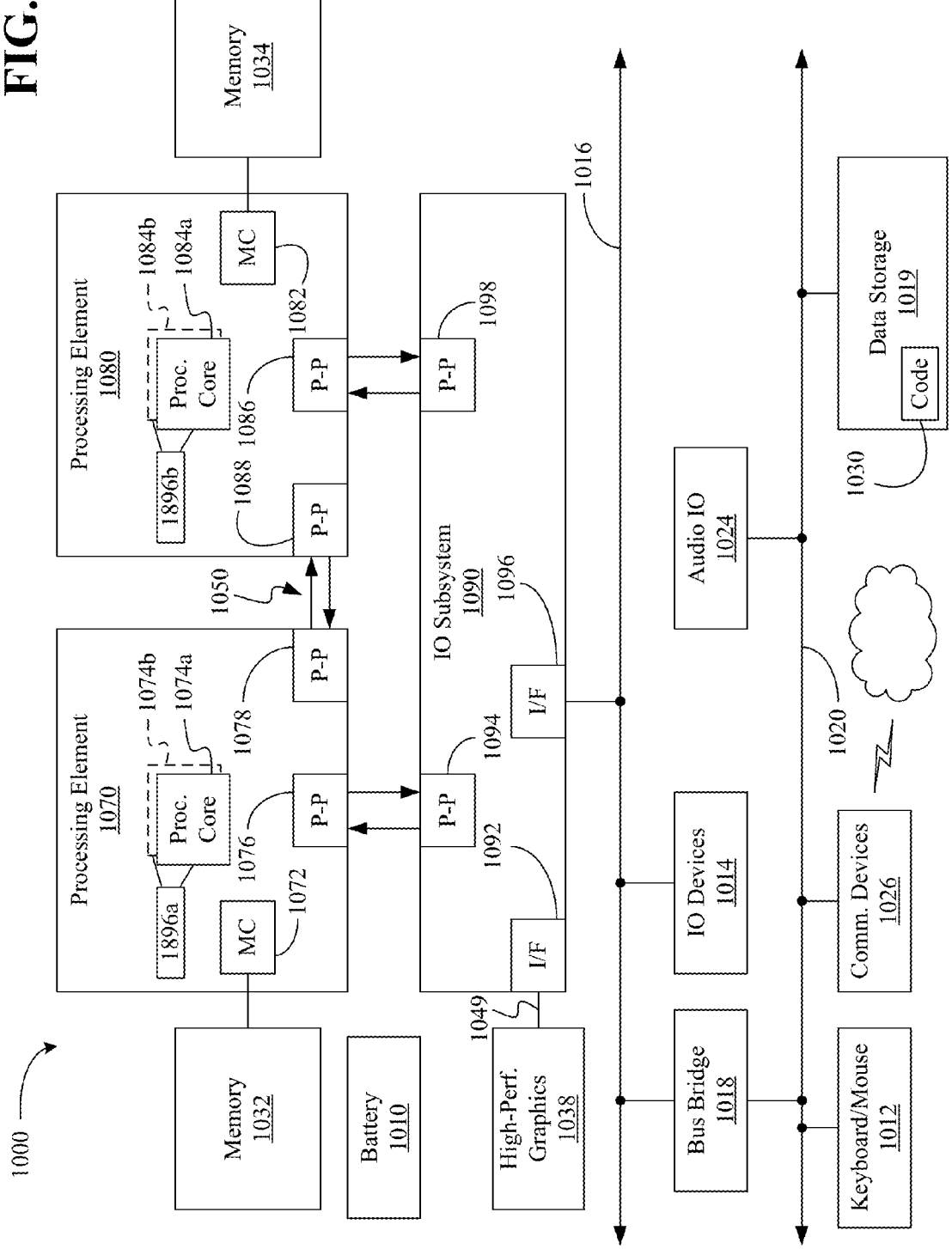
FIG. 8 is a block diagram of an example of a computing system according to an embodiment.

Referring now to FIG. 8, shown is a block diagram of a computing system 1000 embodiment in accordance with an embodiment. Shown in FIG. 8 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 8 may be implemented as a multi-drop bus rather than point-to-point interconnect.

As shown in FIG. 8, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 7.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 8, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 8, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 8, various I/O devices 1014 (e.g., speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement the method 22 (FIG. 2A) and/or the method 32 (FIG. 2B), already discussed, and may be similar to the code 213 (FIG. 7), already discussed. Further, an audio I/O 1024 may be coupled to second bus 1020 and a battery 1010 may supply power to the computing system 1000.

Note that other embodiments are contemplated. For example, instead of the point-to-point architecture of FIG. 8, a system may implement a multi-drop bus or another such communication topology. Also, the elements of FIG. 8 may alternatively be partitioned using more or fewer integrated chips than shown in FIG. 8.

Additional Notes and Examples

Example 1 may include a data generation device comprising a group enroller to determine a first key associated with a first group, a policy manager to determine a first resource exposure policy for the device with respect to the first group, and a data reporter to use the first key to send first operational data to a first dynamic group verifier in accordance with the first resource exposure policy.

Example 2 may include the device of Example 1, further including a context monitor to detect local context change, wherein the group enroller is to determine a second key associated with a second group, the policy manager is to determine a second resource exposure policy for the device with respect to the second group, and the data reporter is to use the second key to send, in response to the local context change, second operational data to a second dynamic group verifier in accordance with the second resource exposure policy.

Example 3 may include the device of Example 1, further including a join session manager to conduct a join protocol session with a group management service, a credential handler to receive a group credential from the group management service during the join protocol session, and a key generator to generate the first key as a pairwise key based on the group credential and a local secret associated with the join protocol.

Example 4 may include the device of Example 3, wherein the join protocol session is to be conducted in accordance with a zero knowledge proof of knowledge protocol.

Example 5 may include the device of Example 3, wherein the group credential is to include a group public key and a group identifier.

Example 6 may include the device of any one of Examples 1 to 5, further including a collection session manager to establish a set of symmetric session keys including pairwise symmetric session keys and one or more symmetric group keys in context of a sigma protocol session with each group member by the dynamic group verifier.

Example 7 may include the device of Example 6, further including an identifier manager to use the set of symmetric session keys to negotiate a temporal identifier of the device.

Example 8 may include the device of Example 6, further including a trusted execution environment, wherein the device is to maintain the set of symmetric session keys, the first key and the first resource exposure policy in the trusted execution environment Example 9 may include a method of operating a device, comprising determining a first key associated with a first group, determining a first resource exposure policy for the device with respect to the first group, and using the first key to send first operational data to a first dynamic group verifier in accordance with the first resource exposure policy.

Example 10 may include the method of Example 9, further including determining a second key associated with a second group, determining a second resource exposure policy for the device with respect to the second group, detecting a local context change, and using the second key to send, in response to the local context change, second operational data to a second dynamic group verifier in accordance with the second resource exposure policy.

Example 11 may include the method of Example 9, wherein determining the first key includes conducting a join protocol session with a group management service, receiving a group credential from the group management service during the join protocol session, and generating the first key based on the group credential and a local secret associated with the join protocol session.

Example 12 may include the method of Example 11, wherein the join protocol session is conducted in accordance with a zero knowledge proof of knowledge protocol.

Example 13 may include the method of Example 11, wherein the group credential includes a group public key and a group identifier.

Example 14 may include the method of Example 11, further including identifying a third key on the device, wherein the third key is an enhanced privacy identifier, using the third key to attest to membership of the device in a third group during the join protocol session, wherein the third group corresponds to a manufacturer of the device.

Example 15 may include the method of any one of Examples 9 to 14, further including establishing a set of symmetric session keys including pairwise symmetric session keys and one or more symmetric group keys in context of a sigma protocol session with each group member by the dynamic group verifier.

Example 16 may include the method of Example 15, further including using the set of symmetric session keys to negotiate a temporal identifier of the device.

Example 17 may include the method of Example 15, further including maintaining the set of symmetric session keys, the first key and the first resource exposure policy to a trusted execution environment on the device.

Example 18 may include at least one computer readable storage medium comprising a set of instructions which, when executed by a device, cause the device to determine a first key associated with a first group, determine a first resource exposure policy for the device with respect to the first group, and use the first key to send first operational data to a first dynamic group verifier in accordance with the first resource exposure policy.

Example 19 may include the at least one computer readable storage medium of Example 18, wherein the instructions, when executed, cause the device to determine a second key associated with a second group, determine a second resource exposure policy for the device with respect to the second group, detect a local context change, and use the second key to send, in response to the local context change, second operational data to a second dynamic group verifier in accordance with the second resource exposure policy.

Example 20 may include the at least one computer readable storage medium of Example 18, wherein the instructions, when executed, cause the device to conduct a join protocol session with a group management service, receive a group credential from the group management service during the join protocol session, and generate the first key based on the group credential and a local secret associated with the join protocol session.

Example 21 may include the at least one computer readable storage medium of Example 20, wherein the join protocol session is to be conducted in accordance with a zero knowledge proof of knowledge protocol.

Example 22 may include the at least one computer readable storage medium of Example 20, wherein the group credential is to include a group public key and a group identifier.

Example 23 may include the at least one computer readable storage medium of any one of Examples 18 to 22, wherein the instructions, when executed, cause the device to establish a set of symmetric session keys including pairwise symmetric session keys and one or more symmetric group keys in context of a sigma protocol session with each group member by the dynamic group verifier.

Example 24 may include the at least one computer readable storage medium of Example 23, wherein the instructions, when executed, cause the device to use the set of symmetric session keys to negotiate a temporal identifier of the device.

Example 25 may include the at least one computer readable storage medium of Example 23, wherein the instructions, when executed, cause the device to maintain the set of symmetric session keys, the first key and the first resource exposure policy in a trusted execution environment on the device.

Example 26 may include a data generation device comprising means for determining a first key associated with a first group, means for determining a first resource exposure policy for the device with respect to the first group, and means for using the first key to send first operational data to a first dynamic group verifier in accordance with the first resource exposure policy.

Example 27 may include the device of Example 26, further including means for determining a second key associated with a second group, means for determining a second resource exposure policy for the device with respect to the second group, means for detecting a local context change, and means for using the second key to send, in response to the local context change, second operational data to a second dynamic group verifier in accordance with the second resource exposure policy.

Example 28 may include the device of Example 26, wherein the means for determining the first key includes means for conducting a join protocol session with a group management service, means for receiving a group credential from the group management service during the join protocol session, and means for generating the first key based on the group credential and a local secret associated with the join protocol session.

Example 29 may include the device of Example 28, wherein the join protocol session is to be conducted in accordance with a zero knowledge proof of knowledge protocol.

Example 30 may include the device of Example 28, wherein the group credential is to include a group public key and a group identifier.

Example 31 may include the device of Example 28, further including means for identifying a third key on the device, wherein the third key is an enhanced privacy identifier, means for using the third key to attest to membership of the device in a third group during the join protocol session, wherein the third group corresponds to a manufacturer of the device.

Example 32 may include the device of any one of Examples 26 to 31, further including means for establishing a set of symmetric session keys including pairwise symmetric session keys and one or more symmetric group keys in context of a sigma protocol session with each group member by the dynamic group verifier.

Example 33 may include the device of Example 32, further including means for using the set of symmetric session keys to negotiate a temporal identifier of the device.

Example 34 may include the device of Example 32, further including means for maintaining the set of symmetric session keys, the first key and the first resource exposure policy to a trusted execution environment on the device.

Thus, techniques described herein may provide for resource exposure policies that may be linked to specific group keys so that data visibility/granularity may be controlled on a per-group basis (e.g., obviating privacy concerns). Moreover, safety and security may be enhanced by using EPID keys (e.g., of differing group affiliation) and group partitions to eliminate unintended device interactions and prevent compromised devices from arresting control of other devices. Moreover, there may be additional group context tied to the EPID keys (group context) including different device identifiers (for scenarios where devices must interact according to a distinguishable device identifier) and different device resource profiles.

In addition, techniques described herein may be considered "lightweight" (e.g., having low processing overhead and resource usage) relative to conventional virtualization solutions that may be used to partition gateways, personal computers and notebook computers with multiple operating systems. These techniques may also enable a particular analytics service provider to be given the illusion of "owning" an IoT device while another analytics service providers may be given the same illusion such that both service providers do not need to cooperate.

Indeed, concerns over collusion among such analytics service providers may be obviated. For example, privacy preserving countermeasures described herein such as group partitioning and separate group context information (e.g., using device IDs within a group and the ability for a user to play a role in definition and administration of an IoT device group) may render attempted collusion ineffective. These properties may also distinguish IoT device groups from PC (personal computer) and server configurations in IT (information technology) and cloud networks.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

I claim:

1. A device comprising:
a group enroller, implemented at least partially in fixed functionality hardware logic, to determine a first key associated with a first group associated with a group formation request from a first dynamic group verifier, and to determine a second key associated with a second group;
a policy manager, implemented at least partially in fixed functionality hardware logic, to determine a first resource exposure policy for the device with respect to the first group, and to determine a second resource exposure policy for the device with respect to the second group; and
a data reporter, implemented at least partially in fixed functionality hardware logic, to use the first key to send first operational data to the first dynamic group verifier in accordance with the first resource exposure policy, and to use the second key to send, in response to a local context change, second operational data to a second dynamic group verifier in accordance with the second resource exposure policy.

2. The device of claim 1, further including a context monitor to detect the local context change.

3. The device of claim 1, further including:
a join session manager to conduct a join protocol session with a group management service;
a credential handler to receive a group credential from the group management service during the join protocol session; and
a key generator to generate the first key as a pairwise key based on the group credential and a local secret associated with the join protocol session.

4. The device of claim 3, wherein the join protocol session is conducted in accordance with a zero knowledge proof of knowledge protocol.

5. The device of claim 3, wherein the group credential is to include a group public key and a group identifier.

6. The device of claim 1, further including a collection session manager to establish a set of symmetric session keys including pairwise symmetric session keys and one or more symmetric group keys in context of a sigma protocol session with each group member by the first dynamic group verifier.

7. The device of claim 6, further including an identifier manager to use the set of symmetric session keys to negotiate a temporal identifier of the device.

8. The device of claim 6, further including a trusted execution environment, wherein the device is to maintain the set of symmetric session keys, the first key and the first resource exposure policy in the trusted execution environment.

9. A method of operating a device, comprising:
determining a first key associated with a first group associated with a group formation request from a first dynamic group verifier;
determining a second key associated with a second group;
determining a first resource exposure policy for the device with respect to the first group;
determining a second resource exposure policy for the device with respect to the second group;
detecting a local context change;
using the first key to send first operational data to the first dynamic group verifier in accordance with the first resource exposure policy; and
using the second key to send, in response to the local context change, second operational data to a second dynamic group verifier in accordance with the second resource exposure policy.

10. The method of claim 9, wherein determining the first key includes:
conducting a join protocol session with a group management service;
receiving a group credential from the group management service during the join protocol session; and
generating the first key based on the group credential and a local secret associated with the join protocol session.

11. The method of claim 10, wherein the join protocol session is conducted in accordance with a zero knowledge proof of knowledge protocol.

12. The method of claim 10, wherein the group credential includes a group public key and a group identifier.

13. The method of claim 10, further including:
identifying a third key on the device, wherein the third key is an enhanced privacy identifier;
using the third key to attest to membership of the device in a third group during the join protocol session, wherein the third group corresponds to a manufacturer of the device.

14. The method of claim 9, further including establishing a set of symmetric session keys including pairwise symmetric session keys and one or more symmetric group keys in context of a sigma protocol session with each group member by the first dynamic group verifier.

15. The method of claim 14, further including using the set of symmetric session keys to negotiate a temporal identifier of the device.

16. The method of claim 14, further including maintaining the set of symmetric session keys, the first key and the first resource exposure policy to a trusted execution environment on the device.

17. At least one non-transitory computer readable storage medium comprising a set of instructions which, when executed by a device, cause the device to:
    determine a first key associated with a first group associated with a group formation request from a first dynamic group verifier;
    determine a second key associated with a second group;
    determine a first resource exposure policy for the device with respect to the first group;
    determine a second resource exposure policy for the device with respect to the second group;
    detect a local context change;
    use the first key to send first operational data to the first dynamic group verifier in accordance with the first resource exposure policy; and
    use the second key to send, in response to the local context change, second operational data to a second dynamic group verifier in accordance with the second resource exposure policy.

18. The at least one non-transitory computer readable storage medium of claim 17, wherein the instructions, when executed, cause the device to:
    conduct a join protocol session with a group management service;
    receive a group credential from the group management service during the join protocol session; and
    generate the first key based on the group credential and a local secret associated with the join protocol session.

19. The at least one non-transitory computer readable storage medium of claim 18, wherein the join protocol session is conducted in accordance with a zero knowledge proof of knowledge protocol.

20. The at least one non-transitory computer readable storage medium of claim 18, wherein the group credential is to include a group public key and a group identifier.

21. The at least one non-transitory computer readable storage medium of claim 17, wherein the instructions, when executed, cause the device to establish a set of symmetric session keys including pairwise symmetric session keys and one or more symmetric group keys in context of a sigma protocol session with each group member by the first dynamic group verifier.

22. The at least one non-transitory computer readable storage medium of claim 21, wherein the instructions, when executed, cause the device to use the set of symmetric session keys to negotiate a temporal identifier of the device.

23. The at least one non-transitory computer readable storage medium of claim 21, wherein the instructions, when executed, cause the device to maintain the set of symmetric session keys, the first key and the first resource exposure policy in a trusted execution environment on the device.

* * * * *